252
101

United States Patent Office 2,872,302
Patented Feb. 3, 1959

2,872,302

ETCHANT

Edward P. Bulan, Flushing, N. Y., assignor to Sylvania Electric Products Inc., a corporation of Massachusetts No Drawing. Application September 12, 1957
Serial No. 683,452

3 Claims. (Cl. 41—42)

My invention relates to copper etchant solutions.

In the printed circuit art it is often necessary to use both copper and nickel or precious metal plated coatings on the same board. It is further necessary to etch away selected copper portions without simultaneously etching away any nickel.

One known approach to this etching problem is to use as an etchant a very dilute solution of chromic-sulphuric acids. The action of this solution is more accentuated on copper than on nickel or precious metals. When sufficiently diluted, the attack on nickel or precious metals is negligible, while the copper is attacked but at a very slow rate. For example, when, in such a solution, the concentration of chromic acid is 12 grams per liter and the concentration of sulphuric acid is 24 grams per liter, and the solution is maintained at a temperature of 70° C., a copper coating .0014 inch thick can be dissolved in 43 minutes.

I have succeeded in modifying this etchant solution in such manner as to increase its rate of attack on copper relative to nickel or precious metals and thereby greatly reduce the etching time required.

Accordingly it is an object of the present invention to modify a chromic-sulphuric acid etching solution in such manner as to increase its rate of attack on copper relative to nickel or precious metals.

Another object is to increase the rate of attack of a chromic-sulphuric acid solution on copper relative to nickel or precious metals by adding ferric nitrate to the solution.

Still another object is to provide a new and improved copper etchant solution containing chromic acid, sulphuric acid and ferric nitrate.

In accordance with the principles of my invention, I add ferric nitrate to a chromic-sulphuric acid solution. When the resultant solution is used in etching copper in the presence of nickel or precious metals, it will be found that the ferric ion attacks copper while the nitrate tends to passivate nickel or precious metal surfaces. Since the acid components preferentially attack copper, the resultant etching solution has substantially no effect on nickel or precious metals.

A typical solution in accordance with my invention has the following composition:

| Material: | Concentration, g./l. |
|---|---|
| Chromic acid | 100 |
| Sulphuric acid | 25 |
| Ferric nitrate | 50 |

A printed circuit board containing copper, nickel, gold, and rhodium surfaces was dipped into this solution. With the temperature of the solution maintained at 75° C., it was found that a .0014 inch thickness of copper could be fully etched away in a 15 minute period without appreciable attack on the nickel, rhodium or gold. Further, if the solution is constantly agitated during the interval in which the circuit board is etched, the same thickness of copper coating could be fully etched away in 4 minutes again without appreciable attack on the nickel, rhodium or gold.

I have found that the ferric nitrate concentration in the above solution can be increased to about 100 grams/liter without causing an appreciable attack on nickel or precious metals. For concentration much in excess of 100 grams/liter, however, the nickel or precious metals are also attacked by the etchant, although of course the copper is attacked much more rapidly. As the concentration decreases toward a lower limit of about 20 grams/liter, the solution is still effective, but its effectiveness decreases.

The temperature of the solution must be raised to at least 60° C., as the rate of attack at lower temperatures is too slow for economic operation. The temperature can be raised, if necessary, to the boiling temperature of the solution but preferably should be maintained within the range 70°–80° C.

The ratio of chromic acid to sulphuric acid as expressed in concentrations by weight should be maintained at about 4 to 1; the absolute amount of chromic acid can be varied within the range 75–125 grams providing that the above ratio is maintained.

While I have shown and pointed out my invention as applied above, it will be apparent to those skilled in the art that many modifications can be made within the scope and sphere of my invention as defined in the claims which follow.

What is claimed is:

1. A copper etchant solution comprising, in aqueous solution, ferric nitrate having a concentration by weight falling within the range 20–100 grams per liter; chromic acid having a concentration by weight falling within the range 75–125 grams per liter; and sulphuric acid, the ratio of chromic acid to sulphuric acid as expressed in concentrations by weight being about 4 to 1.

2. A solution as set forth in claim 1, wherein said solution is maintained at a temperature of at least 60° C.

3. An aqueous solution composed of chromic acid having a concentration by weight falling within the range 75–125 grams per liter; sulphuric acid, the ratio of chromic acid to sulphuric acid as expressed in concentrations by weight being approximately 4; and ferric nitrate having a concentration by weight falling within the range 20–100 grams per liter.

References Cited in the file of this patent

UNITED STATES PATENTS

| | | |
|---|---|---|
| 2,226,383 | Norris | Dec. 24, 1940 |
| 2,318,559 | Percival | May 4, 1943 |

FOREIGN PATENTS

| | | |
|---|---|---|
| 728,284 | Great Britain | Apr. 20, 1955 |